US008940065B2

(12) United States Patent
Rindoks

(10) Patent No.: US 8,940,065 B2
(45) Date of Patent: Jan. 27, 2015

(54) DUCTLESS LABORATORY HOOD APPARATUS

(71) Applicant: Kewaunee Scientific Corporation, Statesville, NC (US)

(72) Inventor: Kurt P. Rindoks, Davidson, NC (US)

(73) Assignee: Kewaunee Scientific Corporation, Statesville, NC (US)

( * ) Notice: Subject to any disclaimer, the term of this patent is extended or adjusted under 35 U.S.C. 154(b) by 78 days.

(21) Appl. No.: 13/833,412

(22) Filed: Mar. 15, 2013

(65) Prior Publication Data

US 2014/0260130 A1 Sep. 18, 2014

(51) Int. Cl.
*B01D 46/00* (2006.01)
*B08B 15/02* (2006.01)

(52) U.S. Cl.
CPC ................ *B08B 15/023* (2013.01); *Y10S 55/18* (2013.01)
USPC ........................ 55/385.2; 55/DIG. 18; 454/56

(58) Field of Classification Search
USPC ................ 55/385.2, 413, 467, 472, 473, 482, 55/DIG. 18, DIG. 29, DIG. 46; 454/49, 56, 454/59, 184, 187, 188, 189; 95/273; 264/6; 977/700, 902
See application file for complete search history.

(56) References Cited

U.S. PATENT DOCUMENTS

| | | | | |
|---|---|---|---|---|
| 4,345,615 | A | 8/1982 | Di Cicco et al. | |
| 4,505,194 | A | 3/1985 | Bishop et al. | |
| 4,548,627 | A | 10/1985 | Landy | |
| 4,560,007 | A | 12/1985 | Molloy et al. | |
| 4,606,260 | A | 8/1986 | Cox | |
| 4,666,478 | A | 5/1987 | Boissinot et al. | |
| 4,854,949 | A | 8/1989 | Giles, Sr. et al. | |
| 4,946,480 | A | 8/1990 | Hauville | |
| 5,211,159 | A | 5/1993 | Lieblein et al. | |
| 5,271,377 | A * | 12/1993 | Rouleau | 126/299 R |
| 5,622,100 | A | 4/1997 | King et al. | |
| 6,623,538 | B2 | 9/2003 | Thakur et al. | |
| 7,766,732 | B2 | 8/2010 | Hauville | |
| 8,163,052 | B2 | 4/2012 | Ono | |
| 2006/0150593 | A1* | 7/2006 | Ono | 55/413 |
| 2007/0105494 | A1* | 5/2007 | Lin | 454/299 |
| 2008/0113598 | A1 | 5/2008 | Pucciani | |
| 2008/0278042 | A1* | 11/2008 | McCarthy et al. | 312/209 |
| 2008/0305731 | A1 | 12/2008 | Reid et al. | |
| 2010/0012110 | A1 | 1/2010 | Feisthammel et al. | |
| 2010/0071326 | A1 | 3/2010 | Alexander et al. | |
| 2010/0071327 | A1* | 3/2010 | Alexander et al. | 55/514 |

(Continued)

*Primary Examiner* — Duane Smith
*Assistant Examiner* — Minh-Chau Pham
(74) *Attorney, Agent, or Firm* — Nelson Mullins Riley & Scarborough LLP

(57) ABSTRACT

A ductless laboratory hood apparatus includes a housing defining an interior work chamber, a filtration chamber, an access window opening into the work chamber from an ambient laboratory environment, and an exhaust outlet opening from the filtration chamber into the laboratory environment, a filter system disposed between the work and filtration chambers, and an air circulation system for creating and directing an airstream to flow from the laboratory environment through the access window, the work chamber, the filter system, the filtration chamber, and the exhaust outlet to return into the laboratory environment. The filter system has both a main filter whose constituent material is highly efficient but is also degradable if exposed directly to laboratory processes, and an attenuation filter disposed between the work chamber and the main filter to intercept and attenuate laboratory processes that potentially degrade the main filter, thereby preventing degradation of the main filter.

8 Claims, 2 Drawing Sheets

(56) References Cited

U.S. PATENT DOCUMENTS

2011/0042110 A1 2/2011 Nijenhuis
2012/0192534 A1* 8/2012 Lambertson ................. 55/385.1
2013/0008429 A1* 1/2013 Colburn et al. ........... 126/299 D
2013/0068098 A1* 3/2013 Haslam ........................... 95/273
2013/0152783 A1* 6/2013 Dobbyn ............................ 95/25

* cited by examiner

DUCTLESS LABORATORY HOOD APPARATUS

FIELD OF THE INVENTION

The present invention relates generally to a laboratory hood apparatus for filtration from the air of contaminants generated by laboratory processes performed within a work chamber and, more particularly to a ductless laboratory hood apparatus having a filter system that includes an attenuation filter in addition to a main filter.

BACKGROUND OF THE INVENTION

Laboratory hood apparatuses of varying configurations are widely known in the prior art. Commonly used in laboratories in both educational institutions and in diverse industries, e.g. chemical, medical, and pharmaceutical industries, laboratory hood apparatuses provide an operator with access to a work chamber for performing various scientific tests, reactions, and experiments while protecting the operator and the ambient laboratory environment from exposure to potentially dangerous contaminants. Such contaminants, including toxic or noxious fumes or reaction byproducts in the form of gases or vapors, produced within the work chamber of the apparatus are eliminated by filtration.

In its basic form, a conventional ducted laboratory hood apparatus has a work chamber which is substantially enclosed, but which includes an access window sufficient for an operator to reach in and perform laboratory processes within the work chamber. An air circulation system draws the air within the work chamber through at least one filter before it is vented through exhaust ducts to the air outside the building. Thus hazardous materials may be handled safely without endangering the operator or others in the workspace.

Such conventional ducted systems do, however, present several drawbacks, including energy inefficiencies, high installation costs, and lack of flexibility with repositioning. In order to address these concerns, ductless laboratory hood apparatuses have been developed. These ductless systems filter the contaminated air produced within the work chamber through use of an air circulation system which functions by using a fan to continuously withdraw air from the work chamber, passing the air through a filter of sufficiently high efficiency and capacity to render the air safe for human consumption, and then returning the air to the ambient laboratory environment.

Known prior art ductless laboratory hood apparatuses provide various advantages over the conventional ducted systems. Significant energy savings are achieved, as heated or cooled air within the room, having been cleaned of contaminants through the ductless laboratory hood apparatus, is returned to the work area. Additionally, ductless laboratory hood apparatuses provide significant flexibility in installation requirements. Costly construction of exhaust ducts is avoided and even after installation, the ductless fume hood may be relatively easily repositioned.

Despite their numerous advantages, ductless fume hoods known in the prior art are still faced with disadvantages, namely limitations presented by available filters having the requisite efficiency to produce air that is safe for human consumption upon its filtration from the work chamber area.

Filter materials conventionally used in both ducted and ductless fume hoods may be formed of a variety of materials for optimal performance in the filtration of various contaminant materials. Most commonly, activated carbon filters are used with ductless fume hoods known in the prior art. While effective in eliminating contaminants, these filters provide a significant disadvantage in that the material of which they are comprised is flammable and, under certain conditions, spontaneous ignition may occur. As various heat sources are necessarily used routinely in experiments and reactions carried out in a laboratory hood apparatus, the flammability of the filter requires that it be disposed a significant distance from any heat sources. This results in conventional ductless laboratory hood apparatuses that are very tall and, therefore, less flexible in installation.

Any filter which is to be disposed closer to a heat source within a laboratory hood apparatus must be sufficiently chemically resistant, provide efficient heat absorption, maintain a specified minimum pressure drop, and filter particles of a particular size.

SUMMARY OF THE INVENTION

The present invention seeks to overcome the foregoing disadvantages in an improved manner over known ductless laboratory hood apparatuses. Basically, the present invention provides a ductless laboratory hood apparatus for disposition in an ambient laboratory environment for containment of laboratory processes which generate toxic or noxious contaminants. More particularly, in accordance with the present invention, a ductless laboratory hood apparatus comprising a housing defining a work chamber and a filtration chamber, a filter system having a main filter and an attenuation filter, and an air circulation system is provided. Potentially contaminated air from the work chamber is driven by the air circulation system through the filter system into the filtration chamber, and from the filtration chamber through an exhaust outlet into the laboratory environment. Passage of toxic or noxious contaminants from the work chamber into the laboratory environment is thereby prevented.

A particularly advantageous feature of the present invention is the incorporation of an attenuation filter in advance of the main filter comprising a material that is degradable if exposed directly to laboratory processes. The attenuation filter intercepts and attenuates laboratory processes that potentially degradate the main filter, thereby allowing the main filter to be situated closer to the work chamber. In accordance with one aspect of the invention, the attenuation filter is a ceramic filter, as the ceramic material is particularly effective to arrest or attenuate flames, whereas other known filters are much more prone to burning or heat degradation. More particularly, the attenuation filter may be comprised of a ceramic foam.

DETAILED DESCRIPTION OF THE PREFERRED EMBODIMENTS

Figure 1:
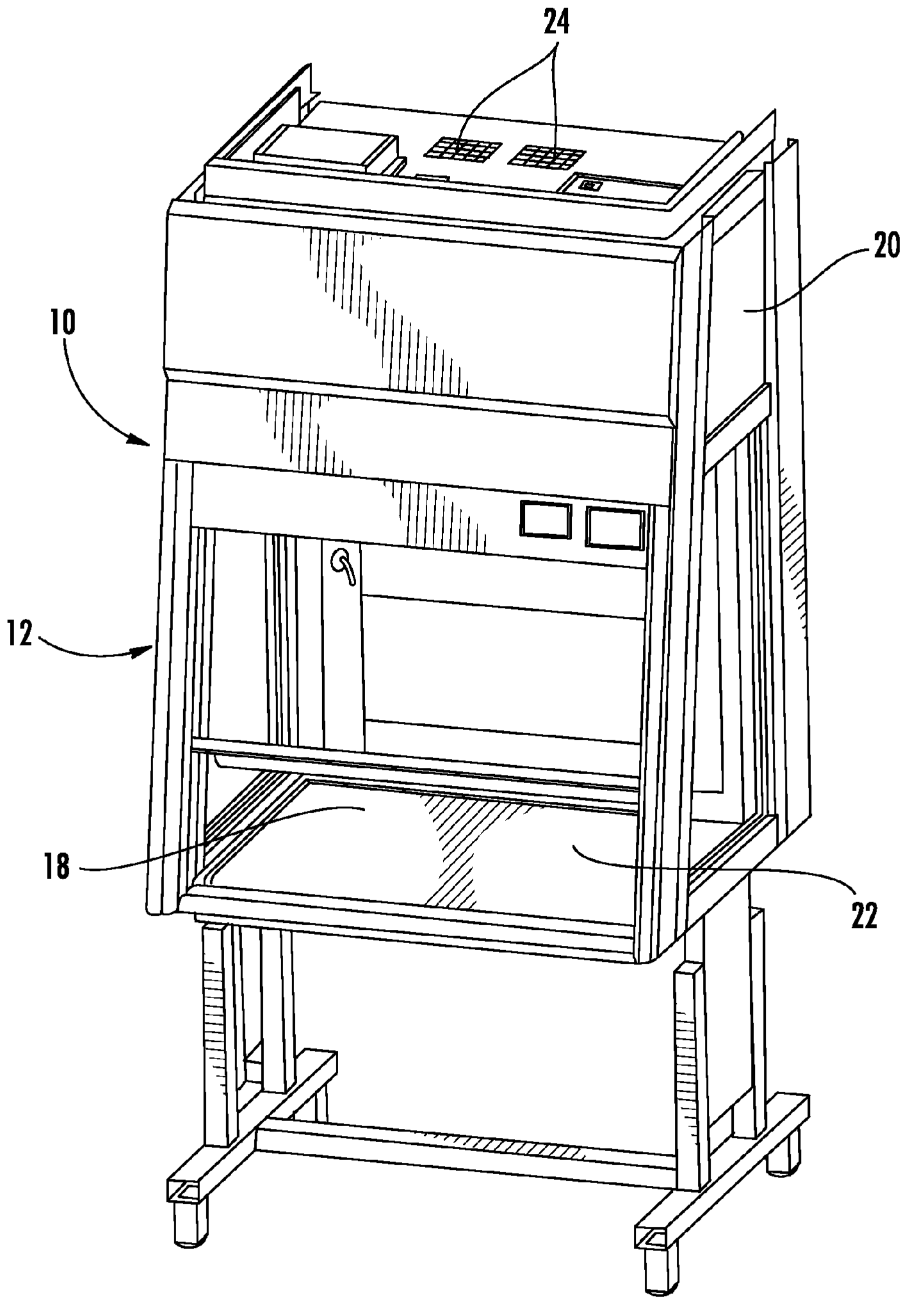
FIG. 1 is a front perspective view of a ductless laboratory hood apparatus in accordance with of the present invention.
Figure 2:
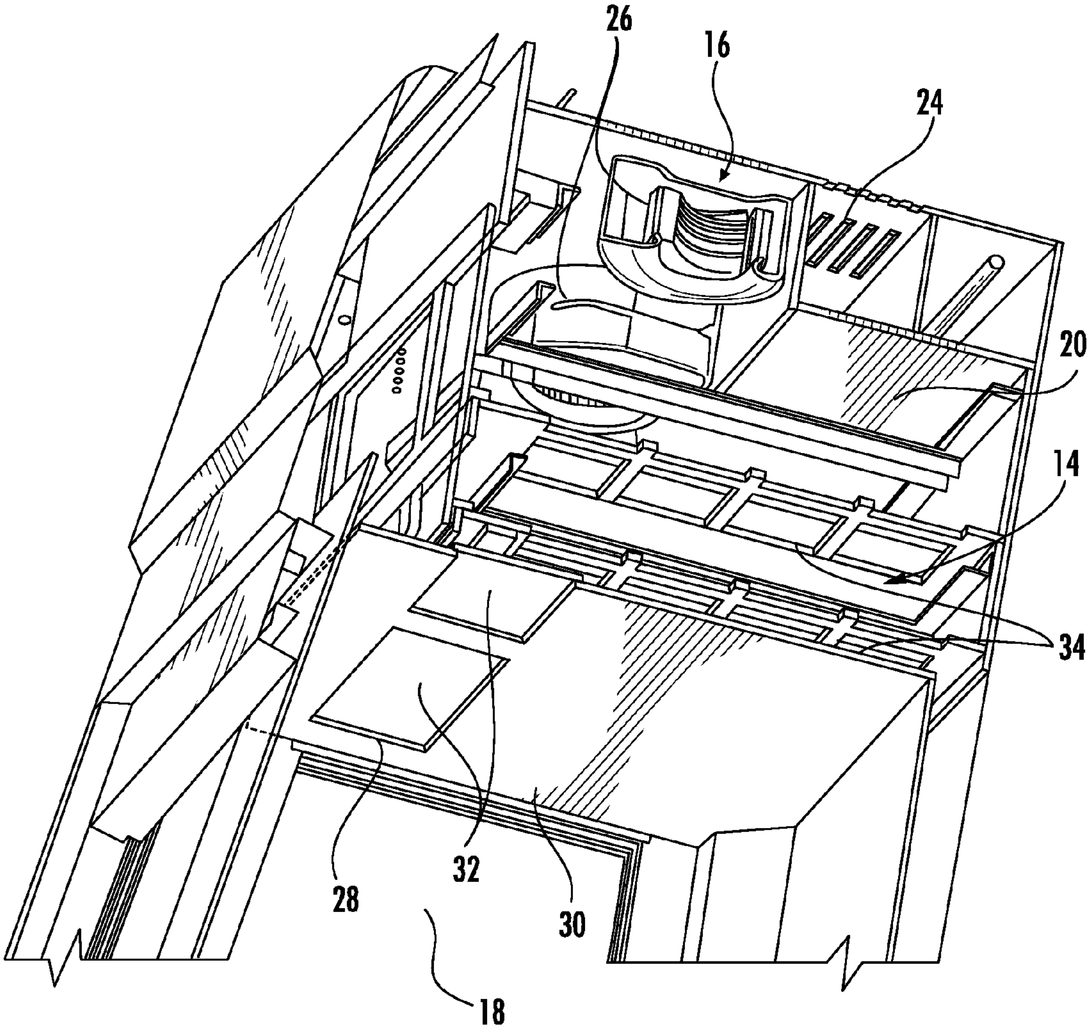
FIG. 2 is a perspective view of a partial cutaway view of the ductless laboratory hood apparatus of FIG. 1.

Referring now to the accompanying drawings of FIGS. 1 and 2, there is illustrated overall at 10 a ductless laboratory hood apparatus in accordance with a preferred embodiment of the present invention. The ductless laboratory hood apparatus 10 basically comprises a housing indicated generally by reference numeral 12, a filter system indicated generally at reference numeral 14, and an air circulation system indicated generally at reference numeral 16.

The housing 12 defines interiorly a work chamber 18 suitable for performance therein of laboratory processes and a filtration chamber 20, separated by the filter system 14. The housing 12 is predominantly enclosed, but includes an access window opening 22 from the ambient laboratory environment into the work chamber 18 that allows an operator to work within the work chamber 18. The housing 12 also includes an exhaust outlet opening 24 from the filtration chamber 20 into the laboratory environment.

The air circulation system 16 creates and directs an airstream to flow from the laboratory environment inwardly through the access window 22 into the work chamber 18, from the work chamber 18 though the filter system 14 into the filtration chamber 20, and from the filtration chamber 20 through the exhaust outlet 24 into the laboratory environment. This prevents toxic or noxious contaminants from passing from the work chamber 18 into the laboratory environment through the access window 22.

The airstream is created by an air blowing device such as, for example, one or more fans 26 disposed within the filtration chamber 20. The airstream directs the contaminated air upwardly from the work surface 18A within the work chamber 18 through an intake vent 28 in a housing wall 30 separating the work chamber 18 from the filtration chamber 20 and into the filter system 14 wherein the contaminated air passes first through an attenuation filter 32 and then through a main filter 34, discussed in detail hereinafter, for removal of at least a sufficient portion of the contamination to render the airstream safe for human consumption, and then to move the filtered air through the exhaust opening 24. The elements of the air circulation system 16 operate to maintain a negative pressure within the work chamber 18 so as to contain any contaminants and insure that all air within the work chamber 18 must flow through the filters 32, 34 of the filter system 14 before venting filtered air through the exhaust opening 24 back into the ambient laboratory environment. It is to be understood that the air blowing device may be disposed either upstream or downstream of the filters.

As mentioned, the filter system 14 of the apparatus 10 is disposed within the housing 12 between the work and filtration chambers 18, 20, and comprises the main filter 34 and the attenuation filter 32. The main filter 34 performs the predominant amount of filtration of contaminants from the airstream and therefore should be of a sufficiently high efficiency and capacity for removing substantially all contaminants from the airstream to render the airstream safe for human consumption For such purpose, the main filter 34 may be of any of a number of conventional filter materials capable of performing at such a level of filtration efficiency, including, but not limited to, fiber, activated carbon, silica gel, or a combination of such materials, e.g., filters of the type commonly referred to as HEPA filters. Because filter materials may vary in effectiveness at filtration of different types of contaminants, different main filter types may be chosen on the basis of the intended use of the ductless laboratory hood apparatus. Disadvantageously, however, the common filter materials most suitable to achieve the desired level of filtration efficiency are degradable if exposed directly to laboratory processes, e.g., heat or flames.

Thus, to protect the main filter 34 from such degradation, the attenuation filter 32 and the main filter 34 are disposed in a serial arrangement within the filter system 14 such that air taken in from the work chamber 18 must first pass through the attenuation filter 32 before reaching the main filter 34. This feature eliminates or at least substantially mitigates the risks of corrosion or fire in the main filter 34. It is to be understood that the present invention contemplates the possibility that the filter system may include a single main filter or a plurality of filters collectively serving as a main filter downstream of the attenuation filter.

In accordance with some embodiments of the present invention, the attenuation filter 32 of the present invention may comprise a ceramic filter. Filters of this variety are typically used for processing liquid metal, rather than air filtration, and therefore provide the advantages of being flame resistant, non-corrosive, and washable. The use of a ceramic filter as an attenuation filter 32 in a laboratory hood apparatus is a particularly unique aspect of the present invention. More specifically, the attenuation filter 32 provides flame resistance in the filter system 14, which allows for the main filter to be situated much more closely adjacent to the work chamber 18 than is conventionally possible without the interposition of the attenuation filter 32. Thus, in turn the overall height of the apparatus 10 may be reduced, giving the apparatus 10 a greater degree of flexibility in installation, e.g., in laboratory environments which could not otherwise accommodate a conventional ductless hood apparatus. The anti-corrosive property is additionally advantageous for chemical processes typically carried out in laboratory hood apparatuses. Additionally, the washable nature of the attenuation filter 32 allows it, with proper handling, to be used essentially as a permanent filter or at least for much longer term use than the main filter 34. A further advantage of the ceramic attenuation filter 32 is that it will collect larger-sized particles before they reach the main filter, thereby extending the life of the main filter.

More particularly, the attenuation filter 32 may be comprised of a zirconia ceramic foam filter, an alumina ceramic foam filter, a magnesium oxide ceramic foam filter, or a silicon carbide ceramic foam filter. Properties of these various types of filters are summarized in the following table:

| Filter Type | Alumina | Magnesium Oxide | Zirconia | Silicon Carbide |
|---|---|---|---|---|
| PPI | 10-50 | 10-60 | | |
| Porosity | 70-95% | 80-90% | 70-80% | 80-90% |
| Density (g/cm$^3$) | .35-.5 | .5-.7 | .9-1.2 | .3-.5 |

Optionally, the present invention may further comprise one or more utility service modules, adapted to be connected to any of various forms of utility service which may be required or desirable in a ductless fume hood device, e.g., electricity, water or gas service (not illustrated) and the utility service modules will accordingly include appropriate control devices, e.g., valve(s), faucet(s), etc., and auxiliary accessories or devices. The one or more utility service modules will typically be mounted in a fixed disposition along the back wall or side wall of the work chamber.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A ductless laboratory hood apparatus for disposition in an ambient laboratory environment for containment of chemical reactions, experiments and other laboratory processes which generate toxic or noxious chemical contaminants in the presence of flames or heat, comprising:

a housing defining interiorly a work chamber suitable for performance therein of said laboratory processes and a filtration chamber, the housing substantially fully enclosing the work chamber except for an access window opening from the laboratory environment into the work chamber, the housing further including an exhaust outlet opening from the filtration chamber into the laboratory environment, a filter system disposed within the housing between the work and filtration chambers, an air circulation system for creating and directing an airstream to flow from the laboratory environment inwardly through the access window into the work chamber, from the work chamber upwardly through the filter system into the filtration chamber, and from the filtration chamber through the exhaust outlet into the laboratory environment, for containing and preventing toxic or noxious chemical contaminants from passage from the work chamber into the laboratory environment through the access window, the filter system comprising a flame attenuation filter and a main filter arranged closely adjacent one another with the flame attenuation filter disposed between the work chamber and the main filter for upward flow of the airstream in sequence first through the flame attenuation filter and then directly through the main filter, wherein:

the main filter being of a sufficiently high efficiency and capacity for removing substantially all toxic or noxious chemical contaminants from the airstream to render the airstream safe for human consumption after exhaust into the laboratory environment, the main filter comprising a flammable material that is damaged if exposed directly to laboratory processes generating flames or heat, and the flame attenuation filter comprising an inflammable heat-resistant porous ceramic foam filtration material disposed to intercept and attenuate flames or heat generated by laboratory processes to prevent the flames or heat from reaching the main filter, thereby preventing damage of the main filter.

2. A ductless laboratory hood apparatus according to claim 1, wherein the main filter is disposed in sufficiently close proximity to the work chamber to be subject to potential damage as a result of flames or heat generated by laboratory processes performed in the work chamber if not intercepted and attenuated by the attenuation filter.

3. A ductless laboratory hood apparatus according to claim 2, wherein the main filter is comprises a flammable material and is disposed in sufficiently close proximity to the work chamber to be subject to potential ignition or combustion as a result of laboratory processes performed in the work chamber if not intercepted and attenuated by the attenuation filter.

4. A ductless laboratory hood apparatus according to claim 1, wherein the ceramic material comprises an alumina ceramic foam.

5. A ductless laboratory hood apparatus according to claim 1, wherein the ceramic foam material has a porosity of about 70-95% and a density of about 0.35-0.5 g/$cm^3$.

6. A ductless laboratory hood apparatus according to claim 1, wherein the ceramic material comprises a zirconia ceramic foam.

7. A ductless laboratory hood apparatus according to claim 1, wherein the ceramic material comprises a silicon carbide ceramic foam.

8. A ductless laboratory hood apparatus according to claim 1, wherein the ceramic material comprises a magnesium oxide ceramic foam.

* * * * *